(12) United States Patent
Eglin

(10) Patent No.: US 9,216,820 B2
(45) Date of Patent: Dec. 22, 2015

(54) DEVICE FOR ASSISTING IN PILOTING A HYBRID HELICOPTER, A HYBRID HELICOPTER PROVIDED WITH SUCH A DEVICE, AND A METHOD IMPLEMENTED BY SAID DEVICE

(75) Inventor: Paul Eglin, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 1229 days.

(21) Appl. No.: 12/773,965

(22) Filed: May 5, 2010

(65) Prior Publication Data

US 2010/0312421 A1 Dec. 9, 2010

(30) Foreign Application Priority Data

Jun. 4, 2009 (FR) ...................................... 09 02683

(51) Int. Cl.
*B64C 27/22* (2006.01)
*B64C 27/04* (2006.01)
*B64C 27/26* (2006.01)
*B64C 27/28* (2006.01)
*B64D 43/00* (2006.01)

(52) U.S. Cl.
CPC ................. *B64C 27/04* (2013.01); *B64C 27/26* (2013.01); *B64C 27/28* (2013.01); *B64D 43/00* (2013.01)

(58) Field of Classification Search
None
See application file for complete search history.

(56) References Cited

U.S. PATENT DOCUMENTS

| 4,514,142 | A | 4/1985 | Young |
| 5,050,081 | A | 9/1991 | Abbott |
| 6,195,598 | B1 | 2/2001 | Bosqui |
| 6,904,340 | B2 | 6/2005 | Andre et al. |
| 2008/0243313 | A1* | 10/2008 | Schaeffer .......................... 701/3 |
| 2008/0294305 | A1* | 11/2008 | Roesch ............................. 701/3 |
| 2009/0321554 | A1 | 12/2009 | Roesch |

FOREIGN PATENT DOCUMENTS

| EP | 1 471 334 A1 | 10/2004 |
| EP | 1471334 A1 | 10/2004 |
| FR | 2 756 256 A1 | 5/1998 |

(Continued)

OTHER PUBLICATIONS

Search Report and Written Opinion; Application No. FR 0902683; dated Jan. 29, 2010.

(Continued)

*Primary Examiner* — Asfand Sheikh
*Assistant Examiner* — Hajime Rojas
(74) *Attorney, Agent, or Firm* — Brooks Kushman P.C.

(57) ABSTRACT

A piloting assistance device for a hybrid helicopter is provided with a rotary wing, two half-wings (8', 8") provided respectively with first and second propellers (6', 6"), and an engine installation continuously driving the rotary wing (100) and the propellers by meshing with a mechanical interconnection system. Furthermore, the device is provided with computer element (40) for determining maximum mean pitch (max) applicable to the first and second propellers without exceeding the power available for the propellers, the computer element determining the maximum mean pitch (max) as a function of the current mean pitch of the blades of the first and second propellers as measured in real time, of a maximum power that can be delivered by the engine installation, of a current power being delivered by the engine installation, and of a relationship determining a power gradient (GRD) as a function of pitch for the first and second propellers.

11 Claims, 1 Drawing Sheet

(56) References Cited

FOREIGN PATENT DOCUMENTS

| FR | 2756256 A1 | 5/1998 |
| FR | 2 916 418 A1 | 11/2008 |
| FR | 2916418 A1 | 11/2008 |
| WO | 96/26472 A1 | 8/1996 |
| WO | 9626472 A1 | 8/1996 |

OTHER PUBLICATIONS

French Search Report, dated Jan. 26, 2010, from corresponding French application.

United States Patent and Trademark Office, Non-Final Office Action for the corresponding U.S. Appl. No. 14/489,831 mailed Feb. 13, 2015.

* cited by examiner

DEVICE FOR ASSISTING IN PILOTING A HYBRID HELICOPTER, A HYBRID HELICOPTER PROVIDED WITH SUCH A DEVICE, AND A METHOD IMPLEMENTED BY SAID DEVICE

FIELD OF THE INVENTION

The present invention relates to a device for assisting in piloting a hybrid helicopter, to a hybrid helicopter provided with such a device, and to a method implemented by said device.

More particularly, the invention thus relates to a hybrid helicopter implementing an advanced concept for a vertical takeoff and landing (VTOL) aircraft.

BACKGROUND OF THE INVENTION

This advanced concept hybrid helicopter is described in document FR 2 916 418 and it combines, at reasonable cost, the effectiveness in vertical flight of a conventional helicopter with the high travel speed performance made possible by using propulsive propellers and the installation of modern turbine engines.

Thus, a hybrid helicopter is neither a helicopter, nor an autogyro, nor a gyrodyne. Similarly, a hybrid helicopter is neither a compound nor a convertible aircraft.

A hybrid helicopter comprises a fuselage, and a rotary wing having a main rotor for driving blades in rotation by means of at least one turbine engine.

The hybrid helicopter is also provided with a wing made up of two half-wings, with two propulsive propellers being placed on either side of the fuselage, on the half-wings.

In addition, the hybrid helicopter is fitted with an integrated drive system that includes not only the turbine engine(s), the main rotor, and the two propellers, but also a mechanical interconnection system between these elements.

With this configuration, the speeds of rotation at the outlet(s) of the turbine engine(s), of the propellers, of the main rotor, and of the mechanical interconnection system are mutually proportional, with the proportionality ratio being constant regardless of the flight configuration of the hybrid helicopter under normal operating conditions of the integrated drive system.

Consequently, and advantageously, the main rotor is always driven in rotation by the turbine engine(s) and it always develops lift, whatever the configuration of the hybrid helicopter, both in forward flight and when hovering.

More precisely, the main rotor is designed to provide all of the lift for the hybrid helicopter during stages of takeoff, of landing, and of vertical flight, and to provide part of its lift during cruising flight, with the wing then contributing lift for supporting said hybrid helicopter.

Thus, the main rotor provides the major fraction of the lift of the hybrid helicopter in cruising flight and possibly makes a small contribution to propulsive or traction forces while always being in a minimum drag configuration.

Like a helicopter, the pilot then has first and second control means for controlling respectively the collective pitch and the cyclic pitch of the blades of the main rotor.

Furthermore, by collectively modifying the pitch of the blades of the propellers of the hybrid helicopter by the same amount, it is also possible to control the thrust generated by the propellers.

Thus, the pilot has at least one thrust control means suitable for collectively modifying the pitch of the blades of the propellers by the same amount.

In contrast, the antitorque and steering functions are provided by using differential thrust exerted by the propellers, e.g. by the pilot operating a rudder bar.

Consequently, the thrust control means enables the mean pitch of the blades of the first and second propellers to be defined, said mean pitch corresponding to half the sum of the first and second pitches of the blades of the first and second propellers.

In contrast, the rudder bar serves to cause the pitches of the blades of the first and second propellers to depart from the mean pitch in differential manner, with the pitch of the blades of one propeller being increased by a certain amount while the pitch of the blades of the other propeller is decreased by the same amount.

It will be understood that it can then be difficult to pilot the hybrid helicopter insofar as there are multiple controls to be operated. Furthermore, it is appropriate to avoid giving orders to the first and second propellers that might degrade the behavior of the helicopter, e.g. by the propellers generating a resultant thrust on the hybrid helicopter in a rearward direction.

Document U.S. Pat. No. 5,050,081 describes an indicator presenting the thrust generated by an aeroengine as a percentage of the maximum thrust available from said engine.

Similarly, document EP 1 471 334 presents an indicator graduated in percentage of the maximum thrust of an engine, which indicator displays the actual thrust and also the thrust requested of the engine.

Although effective, the teaching of those documents is not transposable to a hybrid helicopter. On a hybrid helicopter, thrust is generated by the first and second propellers and also by the main rotor, and not directly by an engine. The technical field of the invention is thus remote from that of the above-mentioned document.

Patent FR 2 756 256 presents an indicator that displays the power margin available from a helicopter turbine engine on an indicator that is graduated in degrees for the collective pitch of the blades of the main rotor.

Nevertheless, that teaching does not make it possible to provide a piloting assistance device for a hybrid helicopter that possesses not only a main rotor but also first and second propellers that are linked to the main rotor by an interconnection system. The special nature of a hybrid helicopter means that an order given to the main rotor has consequences on the first and second propellers, and vice versa, which means that the known state of the art cannot be applied thereto.

Document U.S. Pat. No. 4,514,142 presents an aircraft provided with an engine installation, a main rotor, and a rear thruster arranged at the rear of a tail boom.

According to that document, the total torque available from the engine installation is measured in real time and the torque opposed by the main rotor is subtracted therefrom. More particularly, a first signal is generated in the form of a voltage that is delivered to means for detecting the main rotor torque so that said detector means generate a second signal.

The first and second signals are then optionally delivered to a display that displays variation in the remaining torque available for the rear thruster as a function of time. The difference is then presented between the available engine torque minus the rotor torque.

Although effective, it would appear difficult to make use of such a device in practice to facilitate piloting the aircraft.

OBJECT AND SUMMARY OF THE INVENTION

An object of the present invention is thus to propose a piloting assistance device that makes it easier to pilot a hybrid helicopter in order to optimize the performance of the hybrid helicopter while guaranteeing its safety.

According to the invention, a piloting assistance device for a hybrid helicopter having a rotary wing, first and second half-wings provided respectively with first and second propellers, and an engine installation having at least one turbine engine continuously driving said rotary wing and said propellers by meshing with a mechanical interconnection system is remarkable in that the piloting assistance device is suitable for receiving first and second power values from a regulator member of said engine installation, said first and second power values relating respectively to a maximum power capable of being delivered by said engine installation and to a power currently being delivered by said engine installation, said piloting assistance device comprising:

a mean pitch sensor suitable for measuring a current mean pitch of the blades of the first and second propellers in real time;

an air speed sensor suitable for measuring the true air speed of the hybrid helicopter;

a speed of rotation sensor suitable for measuring the speed of rotation of the propellers of the hybrid helicopter;

a density sensor suitable for measuring the density of the air;

computer means provided with a memory containing a first equation determining a power gradient as a function of pitch for said first and second propellers, the computer means being connected to the mean pitch sensor, to the air speed sensor, to the speed of rotation sensor, and to the air density sensor, and being suitable for receiving said first and second power values to determine a maximum mean pitch applicable to said first and second propellers without exceeding the power available for said propellers, said computer means determining said maximum mean pitch as a function of said current mean pitch, of said first and second power values, and of said power gradient as a function of pitch; and display means suitable for presenting said maximum value power on a display screen.

It should be observed that the term "mean pitch" is used conventionally to mean half the sum of the pitches of the blades of the first and second propellers.

In addition, the member for regulating the engine installation may be a full authority digital engine control (FADEC) electronic regulator member. The regulator member is suitable for delivering first and second power values relating respectively to a maximum power that can be delivered by the engine installation and a power currently being delivered by said engine installation. Reference can thus be made to existing documentation to obtain more details about the regulator member.

Furthermore, it should be observed that the term "rotary wing" is used to designate a system that provides lift and that includes at least one main rotor. More precisely, the rotary wing may comprise a single main rotor or two main rotors, possibly contrarotating rotors.

Under such circumstances, it can be understood that the term "driving the rotary wing in rotation" amounts to stating that all of the main rotors of said rotary wing are driven in rotation. Similarly, the speed of rotation of the rotary wing relates to the speed of rotation of the main rotor(s) of the rotary wing, it being understood that in a rotary wing having two main rotors, they both rotate at the same speed.

Furthermore, it seems obvious that each turbine engine drives the rotary wing in rotation continuously, and thus the main rotor(s) of said rotary wing, together with the first and second propellers under normal conditions of operation.

Clearly a turbine engine that has stopped, whether voluntarily or as a result of a breakdown is no longer in a position to drive the rotary wing and the first and second propellers in rotation. In other words, two configurations are possible:

the engine installation is driving the rotary wing and the first and second propellers under normal conditions; or the engine installation is driving neither the rotary wing nor the first and second propellers, if said engine installation has broken down, or in the event of a simulated breakdown. Such an engine installation may optionally be provided with disconnection means to avoid slowing down the main rotor(s) of the rotary wing.

This characteristic amounts to specifying that a hybrid helicopter is not an autogyro, for example, since its rotary wing is driven continuously in flight by the engine installation under normal flying conditions.

In this context, the invention presents the difference between the power available and the power consumed by the engine installation as a mean pitch difference. Unlike prior art solutions, the invention surprisingly determines the maximum mean pitch as a function of the current pitch, of first and second power values, and of a power gradient as a function of pitch for the first and second propellers.

Thus, the invention avoids a non-desired drop in the speed of rotation of the rotary wing, given that a drop in said speed of rotation of the main rotor could lead to an accident.

Modifying the mean pitch of the blades of the first and second propellers requires a modification to the power currently being delivered by the turbine engine(s).

More precisely, since each propeller and the rotary wing are rotating at a constant ratio, when the mean pitch of the blades of the first and second propellers is increased, the turbine engine(s) is/are constrained to rotate more quickly in order to increase the driving power so that the speed of rotation of the propellers remains constant.

Consequently, the available power margin, in particular for the rotary wing, is reduced.

In the extreme, if the pilot increases the mean pitch of the blades of the first and second propellers excessively, i.e. beyond the maximum mean pitch as determined by the computer means, then the engine installation is no longer capable of providing sufficient power, so the engine installation can no longer ensure that the speed of rotation of the rotary wing is maintained. The hybrid helicopter will then lose height relative to the ground unduly.

Thus, by determining and displaying the maximum mean pitch to be complied with for the blades of the first and second propellers, the pilot is given considerable assistance.

Furthermore, the piloting assistance device may include one or more of the following characteristics.

For example, the computer means cause the display means to present on a display screen a first symbol that represents said maximum mean pitch for the blades of the first and second propellers.

In addition, the first power value may comprise both a maximum power that can be delivered by said engine installation at a first speed of operation, e.g. representative of the maximum continuous power PMC that can be delivered by the turbine engine(s), and a second maximum power that can be delivered by said engine installation at a second speed of operation, e.g. representative of a maximum takeoff power (PMD) from the turbine engine(s), with the computer means determining a first maximum mean pitch for the first speed of operation and a second maximum mean pitch for the second speed of operation.

Thus, the computer means control the display means to cause the display screen to present a first primary symbol representative of the first maximum mean pitch and a first secondary symbol representative of the second maximum mean pitch.

The piloting assistance device includes an air speed sensor suitable for measuring and delivering a first speed value relating to the true air speed of the hybrid helicopter to the computer means, a rotary speed sensor suitable for measuring and delivering a second speed value relating to the speed of rotation of the propellers to the computer means, and a density sensor suitable for measuring and delivering the density of ambient air.

It should be observed that conventionally the term "true air speed" designates the speed of the center of gravity of the hybrid helicopter relative to the outside air, which true air speed is measured, for example, by means of an anemometer suitable for taking external temperature and pressure into consideration.

Under such circumstances, the computer means advantageously determine an autorotation mean pitch for generating zero thrust from the first and second propellers as a function of the first and second speed values.

The invention thus proposes a device that determines and displays the value of an autorotation mean pitch for the blades of the first and second propellers that depends on the true air speed of the hybrid helicopter and on the speed of rotation of the propellers.

In autorotation, the pilot of the hybrid helicopter then adjusts the current mean pitch of the blades of the first and second propellers, i.e. the mean pitch at which the blades of the first and second propellers are to be found at each instant, with the help of means that are suitable for ensuring that the current mean pitch is equal to the autorotation mean pitch for the blades of the first and second propellers.

Under such circumstances, the power dissipated by the first and second propellers is at a minimum, thereby improving the capacity of the aircraft in autorotation.

Optionally, the computer means control the display means to cause the display screen to present a second symbol representative of the autorotation mean pitch.

Advantageously, the computer means control the display means to cause a display screen to present a first symbol representing the autorotation mean pitch for the blades of the first and second propellers:
  if the autorotation mean pitch is greater than 5 degrees; and
  if the true air speed measured by the air speed sensor is greater than 20 meters per second.

Thus, the computer means cause the display screen to display a second symbol representing the autorotation mean pitch for the blades of the first and second propellers, providing the above-mentioned conditions are satisfied.

Furthermore, the piloting assistance device is suitable for being connected to an autopilot device of the hybrid helicopter, with the computer means being suitable for controlling the display means to present, and thus display, a third symbol on the display screen, the third symbol relating to a mean pitch setpoint given by the autopilot device.

While flight is being controlled by an autopilot device, the autopilot device establishes a setpoint for the mean pitch of the first and second propellers in order to regulate the engine installation.

The setpoint generated by the autopilot device is then displayed on the piloting assistance device.

By comparing the setpoint with the real mean pitch of the first and second propellers, the pilot is in a position to have an informed opinion about proper operation of the autopilot device, since the real mean pitch ought normally to be equal to the setpoint.

Furthermore, in order to facilitate hovering, the computer means include a memory storing in particular an optimized range for the mean pitch during hovering flight, the computer means controlling the display means to present, and thus display, a fourth symbol on the display screen, the fourth symbol representing the optimized range.

Hovering on a hybrid helicopter is not as simple as on a conventional helicopter.

Consequently, two limit procedures may be envisaged.

The first procedure consists in piloting the hybrid helicopter so that it presents an attitude and a resultant thrust from the first and second propellers that are zero. The first and second propellers then deliver respective thrusts directed in opposite directions, one propeller exerting thrust of value opposite to that from the other propeller so as to compensate the torque exerted by the rotary wing, except in the potential situation where said rotary wing has two contrarotating main rotors. As a result, the thrust from the first and second propellers oppose said torque and the resultant thrust from the first and second propellers is zero.

The second procedure consists in particular in using the yaw control means so that one propeller exerts non-zero forward thrust and the other propeller exerts zero thrust, the first and second propellers then delivering non-zero resultant thrust in a forward direction for the aircraft.

Nevertheless, since the resultant thrust from the first and second propellers tends to cause the hybrid helicopter to advance, it is appropriate to cause the hybrid helicopter to take on a nose-up position in order to remain stationary instead of advancing.

In order to optimize these procedures, the computer means possess in memory a determined optimized range making it possible firstly to minimize the power needed to enable the hybrid helicopter to remain stationary, and secondly to avoid the hybrid helicopter taking up an excessively nose-up attitude.

More precisely, the optimized range extends from a first hovering mean pitch of about −5° to a second hovering mean pitch of about +5°.

Advantageously, the first hovering mean pitch enables the combined thrust from the propellers to oppose the torque generated by the rotary wing under the above-mentioned conditions, with the resultant thrust from the first and second propellers being zero. The first pitch is then equal to the minimum mean pitch for hovering flight.

In other words, one propeller is exerting thrust directed in one direction and having a first value, while the other propeller is generating thrust exerted in a second direction opposite to the first direction and having the same value.

In contrast, the second hovering mean pitch enables thrust to oppose said torque, with the resultant thrust from the first and second propellers being at its maximum for hovering flight.

Under such circumstances, the second hovering pitch generates zero thrust from one propeller and thrust from the other propeller that opposes the torque generated by the rotary wing.

Furthermore, since the computer means are suitable for displaying at least one symbol on said display screen, each symbol is optionally positioned on an angular sector that is graduated in mean pitch degrees for the blades of the first and second propellers.

The piloting assistance device includes measurement means connected to said computer means to inform it of the current mean pitch of the blades of the first and second propellers, with the computer means causing said current mean pitch to be displayed, the display means showing the current mean pitch via a pointer suitable for sweeping the angular sector or via said pointer and a digital display.

The present invention also provides a hybrid helicopter provided with a rotary wing, first and second half-wings provided respectively with first and second propellers, and an engine installation having at least one turbine engine continuously driving said rotary wing and said propellers by meshing with a mechanical interconnection system.

The hybrid helicopter is then remarkable in that it includes said piloting assistance device of the invention as described above.

Finally, in addition to the piloting assistance device and the hybrid helicopter including the piloting assistance device, the invention also provides the method of assisting the piloting of a hybrid helicopter as implemented by said piloting assistance device.

According to the invention, a method of assisting the piloting of a hybrid helicopter provided with a rotary wing, first and second half-wings provided respectively with first and second propellers, and an engine installation having at least one turbine engine continuously driving said rotary wing and said propellers by meshing with a mechanical interconnection system, is remarkable in that there is displayed on a display screen a maximum mean pitch applicable to said first and second propellers without exceeding the power available for said propellers determined as a function of the current mean pitch of the blades of the first and second propellers measured in real time, of a maximum power that can be delivered by said engine installation, of a current power being delivered by said engine installation, and of a power gradient as a function of pitch for said first and second propellers.

Optionally, the maximum mean pitch is determined by performing the following steps during a preliminary stage:

a) plotting a family of curves on a diagram plotting the pitch of a blade of said propellers at a distance equal to 0.75 times the span of said blades along the abscissa and the power coefficients of the first and second propellers up the ordinate, each curve being established at a given advance coefficient as a function of the quotient of the true air speed of the hybrid helicopter divided by the speed of the free end of the blade, said speed of the free end of the blade being equal to the product of the speed of rotation of a propeller multiplied by the span of said blade;

b) determining an intermediate equation from said family of curves to give said power coefficient as a function of said pitch of a blade of said propellers at a distance equal to 0.75 times the span of said blade and of said advance coefficient, and then determining a first equation giving a power gradient as a function of pitch as a function of the partial derivative of said intermediate equation relative to pitch, for example using a conventional multivariable polynomial regression method;

and then implementing the following steps in real time in flight:

c) determining a power gradient as a function of pitch with the help of said first equation by calculating said partial derivative using the values for the current mean pitch and the current advance coefficient; and d) determining said maximum mean pitch using the following first relationship:

$$\beta max = \beta_{cur} + [(P1*(\Omega/\Omega'))-P2]/GRD$$

where:

"/" represents the division sign;

"*" represents the multiplication sign; "βmax" represents the maximum mean pitch;

"$\beta_{cur}$" represents the current mean pitch as measured in real time;

"P1" represents the maximum power that can be delivered by the engine installation;

"P2" represents the current power being delivered by the engine installation;

"Ω" represents the speed of rotation of said first and second propellers;

"Ω'" represents a setpoint for the speed of rotation of said first and second propellers; and "GRD" represents said power gradient as a function of pitch.

It should be observed that the setpoint speed of rotation Ω' for the first and second propellers is generated by a generator member that does not form part of the subject matter of the present application, said setpoint speed of rotation for the first and second propellers being proportional to the speed of rotation of the rotary wing.

The setpoint speed of rotation Ω' of the first and second propellers may be constant or it may be variable as a function in particular of the external temperature. By way of example, reference may be made to document FR 2 916 421 to obtain more information about this setpoint for the speed of rotation of the first and second propellers.

Optionally, there is determined and displayed on the display screen an autorotation mean pitch as a function of the true air speed of the hybrid helicopter and of the speed of rotation of the propellers using the following second relationship:

$$\beta 0 = \alpha 0 + \arctan[VH/(\Omega*0.75*R)]$$

where:

"/" represents the division sign;

"*" represents the multiplication sign;

"arctan" represents the arc tangent trigonometric function;

"β0" represents the autorotation mean pitch;

"α0" represents the angle of incidence of a blade of a propeller that would generate zero lift by the blade;

"VH" represents the true air speed of the hybrid helicopter;

"Ω" represents the speed of rotation of the first and second propellers; and

"R" represents the span of the blade.

Finally, it is possible to display on a display screen a setpoint that is given by an autopilot device.

BRIEF DESCRIPTION OF THE DRAWINGS

The invention and its advantages appear in greater detail in the context of the following description of embodiments given by way of illustration and with reference to the accompanying figures, in which.

Elements that are present in two or more of the figures are given the same references in each of them.

MORE DETAILED DESCRIPTION

Figure 1:
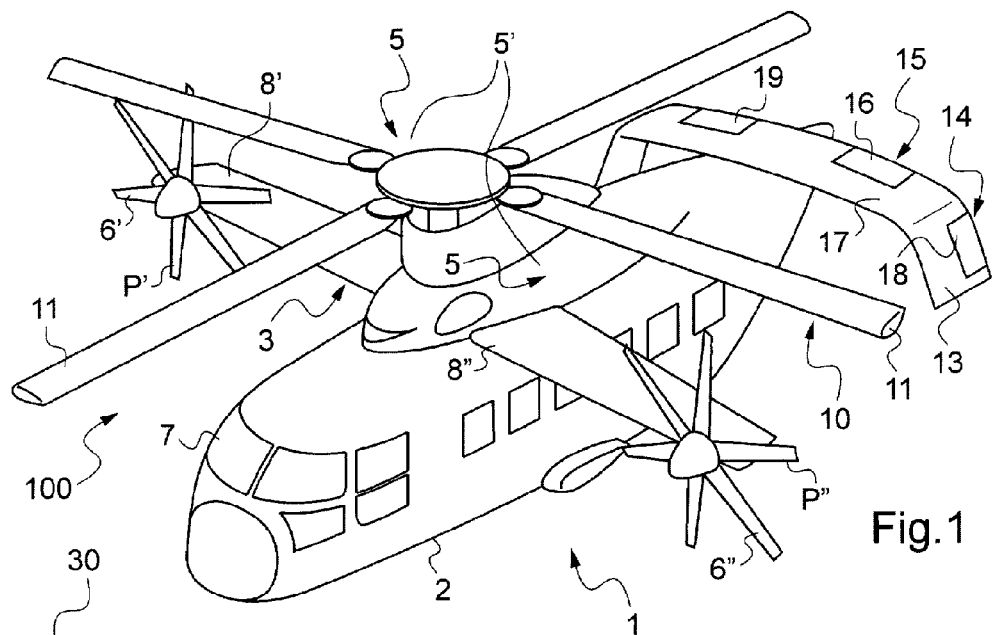
FIG. 1 is an isometric view of a hybrid helicopter.

FIG. 1 shows a hybrid helicopter 1 comprising a fuselage 2 with a cockpit 7 at the front thereof, a rotary wing 100 comprising a main rotor 10 for driving blades 11 in rotation, and taking drive from an engine installation 5' having two turbine engines 5 disposed on top of the fuselage 2, on either side of the fuselage 2 about the longitudinal plane of symmetry of the aircraft, via a first main gearbox, not shown in FIG. 1.

It should be observed that the two turbine engines 5 are not visible in FIG. 1 because of the presence of fairings.

The hybrid helicopter 1 is also provided with a high wing 3 made up of two half-wings 8' and 8" located at the top of the fuselage 2.

The propulsion of the hybrid helicopter 1 is provided in particular by first and second propellers 6' and 6" driven by the two turbine engines 5, with a respective propeller 6', 6" being disposed at each outer end of the wing 3. The first and second propellers 6', 6" comprise respectively six first blades P' and six second blades P''' in the example shown.

Furthermore, in the vicinity of the rear end of the fuselage 2, there are optionally provided stabilizer and control surfaces, specifically for pitch control a horizontal stabilizer 15 with two movable pitch control surfaces 16, 19 that are movable relative to a front portion 17, and for steering, two vertical fins 14, one at each end of the horizontal stabilizer 15.

Specifically, the horizontal stabilizer 15 and the vertical fins 14 form an upside-down U-shape on the top of the fuselage 2.

Advantageously, the fins 14 that are vertical or inclined relative to the vertical may comprise respective stationary front portions 13 and movable rear portions 18.

Compared with other aircraft, this hybrid helicopter 1 is remarkable in particular in that the speeds of rotation of the outlets from the turbine engines, of the propellers, of the rotor, and of the mechanical system interconnecting them are mutually proportional, with the proportionality ratio being constant regardless of the flying configuration of the hybrid helicopter under normal conditions of operation of the integrated drive system.

To control advance of the hybrid helicopter, the pilot has a thrust control for modifying the mean pitch of the first and second blades P', P''' of the first and second propellers 6', 6".

More precisely, the thrust control acts identically on the first and second pitches of the first and second blades P', P''' so as to obtain collective variation of said first and second pitches. For example, the pilot might request an increase of 5° in the mean pitch of the set of blades making up the propellers in order to increase the resulting thrust generated in particular by the first and second propellers, said mean pitch of the blades of the first and second propellers being equal to half the sum of the first and second pitches of the first and second blades P', P'''.

The thrust control may comprise a lever acting on a linkage connected to the first and second propellers.

Alternatively, or in addition, the thrust command may optionally be provided with a knob suitable for controlling at least one actuator disposed on said linkage. The knob advantageously has three positions, namely a first position requesting an increase in the mean pitch of the blades of the first and second propellers, and thus a collective variation by the same amount of the first and second pitches of the first and second blades P', P''', a second position requesting a decrease in the first and second pitches of the first and second blades P', P''', and finally a third position requesting no modification of the first and second pitches of the first and second blades P', P'''.

In order to control the yaw attitude of the hybrid helicopter, the pilot has a yaw control device provided with yaw control means, conventionally a rudder bar, for generating variation of the first and second pitches of the first and second blades P', P''' that is not collective, but differential.

Finally, the hybrid helicopter 1 is provided with control means for controlling the collective pitch and the cyclic pitch of the blades 11 of the main rotor 10.

In order to avoid being confronted with maneuvers that might endanger the hybrid helicopter, the hybrid helicopter is provided with a piloting assistance device.

Figure 2:
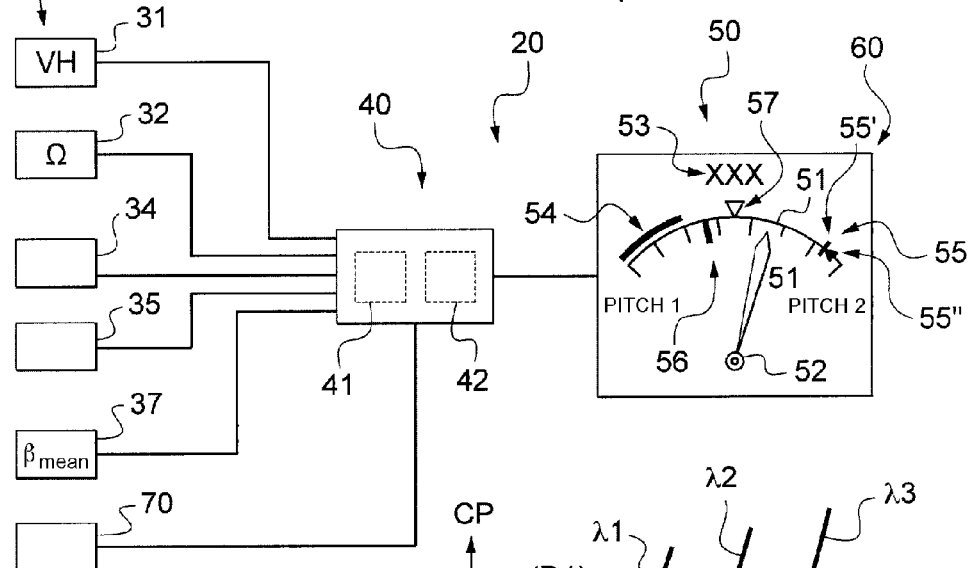
FIG. 2 is a diagram showing a piloting assistance device for such a hybrid helicopter.

FIG. 2 shows such a piloting assistance device 20.

The piloting assistance device 20 comprises display means 50 and a plurality of sensors 30 connected to computer means 40, the computer means 40 having processor means 41 and a memory 42.

In the method implemented by the piloting assistance device 20, a first symbol 55 is displayed on a display screen 60 of the display means 50 to represent a maximum mean pitch that may be applied to the first and second propellers without exceeding the power available for the propellers, i.e. without depriving the main rotor 10 of the power it needs to operate properly.

The computer means 40 are thus connected to:
- a mean pitch sensor 37 suitable for measuring the current mean pitch of the blades of the first and second propellers 6', 6" in real time;
- a regulator member 34 for regulating the engine installation, the regulator member 34 delivering first and second power value(s) to the computer means 40, the first and second power value(s) representing respectively the maximum power value determined by the manufacturer that can be delivered by the engine installation, and the power value currently being delivered by said engine installation 5';
- an air speed sensor 31 suitable for measuring the true air speed of the hybrid helicopter;
- a speed of rotation sensor 32 suitable for measuring the speed of rotation of the propellers of the hybrid helicopter; and
- a density sensor 35 suitable for measuring the density of the air.

It should be observed that the mean pitch sensor 37 may be a sensor that is dedicated to the present application, or it may be a sensor that is already present on the hybrid helicopter 1 for other applications, or indeed incorporated in other pieces of equipment.

Under such circumstances, the computer means are in a position to determine the value of the maximum mean pitch that should not be exceeded, this maximum mean pitch in fact varying over time depending on the behavior of the hybrid helicopter 1.

Figure 3:
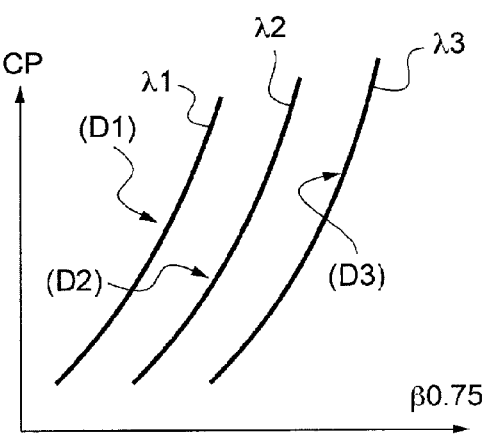
FIG. 3 is a diagram explaining a preliminary stage suitable for determining the maximum mean pitch.

More precisely, with reference to FIG. 3, and during a preliminary stage:

a) a family of curves D1, D2, D3 is plotted in a diagram plotting the pitch $\beta 0.75$ of a blade of the propellers 6', 6" at a distance equal to 0.75 times the span R of the blades along the abscissa and plotting the power coefficients CP of the first and second propellers 6', 6" up the ordinate, each curve D1, D2, D3 being established for a given advance coefficient $\lambda 1$, $\lambda 2$, $\lambda 3$, and then;

b) from the family of curves, determining an intermediate equation giving the power coefficient CP as a function of said pitch $\beta 0.75$ of a blade of a propeller at a distance equal to 0.75 times the span R of said blade, and as a function of the advance coefficient.

It should be recalled that the power coefficient CP of a blade is given by:

$$CP = \frac{P}{0.5 \times \rho \times \pi \times R^2 \times U^3}$$

where:
- P represents the power of the propeller;
- ρ the density of air;
- R the span of a blade of the propeller; and
- U the speed of the free end of a blade of the propeller.

Thus, during step b), the family of curves D1, D2, D3 is established by testing. Each curve D1, D2, D3 is established at a predetermined advance coefficient λ1, λ2, λ3, with each advance coefficient λ1, λ2, λ3 being equal to the quotient of a true air speed VH of the hybrid helicopter divided by the speed U of the free end of the blade, the speed U of the free end of the blade being equal to the product of the speed of rotation Ω of a propeller multiplied by its span R.

It should be observed that FIG. 3 shows three curves D1, D2, D3. Nevertheless, it will readily be understood that it is possible to use a larger number of curves.

It then suffices to implement a conventional mathematical operation, e.g. a polynomial regression, in order to determine said intermediate equation CP=f(β0.75,λ).

Thereafter, a first equation is determined giving a power gradient GRD as a function of the pitch, as a function of the partial derivative $$\frac{\partial CP}{\partial \beta}$$

of said intermediate equation relative to the pitch. Thus, the first equation is:

$$GRD = 0.5 \times \rho \times \pi \times R^2 \times U^3 \times \frac{\partial CP}{\partial \beta}(\beta, \lambda)$$

where ρ is the density of the air, and "×" is the multiplication sign.

The first equation is then stored in the memory 42 of the computer means 40.

Under such conditions, the following steps are implemented in flight in real time.

In a step c), the computer means 40 determines a power gradient GRD as a function of pitch in real time using the first equation as stored in the memory 42, by calculating the value of said partial derivative at the current mean pitch $\beta_{cur}$ and at the current advance coefficient $\lambda_{cur}$ as determined in real time in flight. More precisely, the current power gradient GRD as a function of pitch is equal to the value of said first equation at the current mean pitch $\beta_{cur}$, at the current speed $U_{cur}$ at the free end of the blade, at the current air density $\rho_{cur}$, and at the current advance coefficient $\lambda_{cur}$, i.e.:

$$GRD = 0.5 \times \rho_{cur} \times \pi \times R^2 \times U_{cur}^3 \frac{\partial CP}{\partial \beta}(\beta_{cur}, \lambda_{cur})$$

Once the current power gradient GRD as a function of pitch has been determined in real time, then during a step d), the maximum mean pitch βmax is determined by the computer means 40 using the following first relationship:

$$\beta max = \beta_{cur} + [(P1*(\Omega/\Omega'))-P2]/GRD$$

where:
- "/" represents the division sign;
- "*" represents the multiplication sign;
- "βmax" represents the maximum mean pitch;
- "$\beta_{cur}$" represents the current mean pitch measured in real time by the mean pitch sensor 37;
- "P1" represents the maximum power capable of being delivered by the engine installation, this maximum power being transmitted to the computer means 40 by the regulator member 34 in the form of a first power value;
- "P2" represents the current power being delivered by the engine installation, this current delivered power being transmitted to the computer means 40 by the regulator member 34 in the form of a second power value;
- "Ω" represents the speed of rotation of said first and second propellers;
- "Ω'" represents the setpoint for the speed of rotation of said first and second propellers; and
- GRD represents said power gradient as a function of pitch as determined in real time by the computer means 40 during step c).

Steps c) and d) are then performed in a loop throughout the flight so that the maximum mean pitch is determined continuously and in real time.

Furthermore, the first power value may contain two values: a first maximum power that the engine installation can deliver at a first speed of operation known as maximum continuous power (PMC); and a second maximum power that can be delivered by the engine installation at a second speed of operation known as maximum takeoff power (PMD).

During step d), the computer means 40 then determines a first maximum mean pitch for the first speed of operation PMC and a second maximum mean pitch for the second speed of operation PMD.

The computer means 40 then control the display means to cause a display screen 60 to present a first primary symbol 55' representing the first maximum mean pitch and a first secondary symbol 55" representing the second maximum mean pitch.

After determining the maximum mean pitch for the blades of the first and second propellers, the computer means 40 cause the display means 50 to display the first symbol 55 representing said maximum mean pitch on a graduated angular scale 51.

As shown in FIG. 2, the display screen shows an angular sector 51 that is graduated in mean pitch degrees of the first and second propellers, this angular sector extending from a first mean pitch PITCH1 of about −10 degrees for example, to a second mean pitch, PITCH2, having a value of 45 degrees, for example.

The first symbol 55 then appears in this angular sector 51.

Furthermore, the computer means 40 determine a mean pitch in autorotation as a function of the true air speed VH of the hybrid helicopter 1 and of the speed of rotation of said propellers 6', 6".

More precisely, the air speed sensor 31 and the rotation speed sensor 32 measure and transmit respective first and second speed values to the computer means 40, the first speed value relating to the true air VH of the hybrid helicopter 1 while the second speed value relates to the speed of rotation Ω of the propellers.

The air speed and rotation speed sensors 31 and 32 are of conventional type and commercially available, or they may form parts of other devices in the hybrid helicopter 1.

The computer means 40 then determine a mean pitch in autorotation for the blades of the first and second propellers, which mean pitch varies as a function of the behavior of the hybrid helicopter 1.

Thereafter, the computer means 40 determine and display on the display screen 60 an autorotation mean pitch β0 as a function of the true air speed VH of the hybrid helicopter 1 and of the speed of rotation Ω of the propellers 6', 6" using the following second relationship:

$$\beta 0 = \alpha 0 + \arctan [VH/(\Omega * 0.75 * R)]$$

where:
"/" represents the division sign;
"*" represents the multiplication sign;
"arctan" represents the arc tangent trigonometric function;
"β0" represents the autorotation mean pitch;
"α0" represents the angle of incidence of a blade of a propeller that would generate zero lift by said blade;
"VH" represents the true air speed of the hybrid helicopter;
"Ω" represents the speed of rotation of said propellers; and
"R" represents the span of said blade.

In a variant, it is possible to determine a second equation in the memory 42 of the computer means 40 for obtaining the autorotation mean pitch as a function of the speed of advance.

Thus, during a preliminary phase, a diagram is established plotting the pitch β0.75 of a blade of a propeller at a distance equal to 0.75 times the span R of said blade along the abscissa, and plotting the thrust coefficient Ct of said propeller up the ordinate. Tests are then performed to trace a plurality of curves in said diagram, with each curve being established as a function of a given speed of advance.

Using a conventional inverse polynomial regression method, an intermediate equation β0=f(Ct,λ) is deduced mathematically therefrom. In order to establish the second required equation, it suffices to cancel the terms in the equation that depend on the thrust coefficient Ct insofar as it is desired to obtain the autorotation mean pitch where thrust is zero.

The second equation then has the form β0=f(λ).

The computer means 40 then determine the autorotation mean pitch β0 in real time using the current advance coefficient at each instant.

Once the autorotation mean pitch has been determined, the computer means 40 cause the display means to make a second symbol 56 appear on the display screen 60, the second symbol representing the autorotation mean pitch for the blades of the first and second propellers.

It should be observed that the second symbol is important for the pilot since the autorotation pitch is the mean pitch that gives rise to zero thrust from each propeller.

In order to guarantee proper execution of an autorotation procedure, the pilot then needs only to adjust the real mean pitch of the blades of the first and second propellers so that it becomes equal to the autorotation mean pitch displayed via the second symbol 56. It can be understood that the piloting assistance device makes this operation easier.

Furthermore, in order to protect the mechanical transmission system of the hybrid helicopter in forward flight, the pilot need only verify that the real mean pitch, i.e. the mean pitch at a given instant, is greater than the autorotation mean pitch.

Optionally, the computer means 40 cause the autorotation mean pitch of the blades of the first and second propellers to be displayed under certain conditions, specifically:
if the autorotation mean pitch of the blades of the first and second propellers is greater than 5 degrees; and
if the measured true air speed VH is greater than 20 meters per second.

In addition, in order to enable the pilot to compare the real mean pitch of the blades of the first and second propellers with the autorotation mean pitch, in particular, the computer means 40 are advantageously connected to a mean pitch sensor 37, the mean pitch sensor 37 delivering the value of the current mean pitch $\beta_{MOY}$ to the computer means 40.

The computer means 40 then cause the display means to present the current mean pitch $\beta_{MOY}$ of the blades of the first and second propellers on the display screen 60. The current mean pitch is optionally displayed by a digital display 53 and/or by a pointer 52 sweeping the angular sector 51.

Consequently, the pilot can tell immediately where the current mean pitch of the blades of the first and second propellers is situated, for example.

Furthermore, in the variant shown, the display screen 60 displays a third symbol 57 corresponding to a setpoint given by an autopilot device, this setpoint being liable to vary over time.

The computer means 40 is then connected to an autopilot device 70 of the hybrid helicopter 1, the autopilot device 70 delivering said setpoint to the computer means 40.

Under such circumstances, the computer means 40 cause the display means to display a third symbol 57 representing the setpoint on the angular scale 51 of the display screen 60.

Furthermore, the color of the third symbol may vary depending on piloting mode, having a first color when flying on autopilot and a second color when flying with semi-automatic or assisted piloting.

Finally, the computer means 40 shown in FIG. 2 include a memory 42 storing an optimized range for performing hovering flight without consuming excessive power and giving rise to a negligible degree of nose-up attitude.

The computer means 40 then cause the display means to display a fourth symbol 54 representing said optimized range on the graduated angular scale 51 that appears on the display screen 60.

It should be observed that the optimized range is unchanging, unlike the autorotation mean pitch of the blades of the first and second propellers, the maximum mean pitch of the blades of the first and second propellers, or the setpoint given in autopilot mode, said optimized range being determined by testing or by calculation, for example.

Thus, the pilot may use a single piloting assistance device 20 for piloting the mean pitch of the blades of the first and second propellers 6', 6".

This piloting assistance device 20 displays all of the symbols 55, 56, 57, and 54 needed for assisting the pilot during various maneuvers, said symbols appearing on a scale 51 that is graduated with the mean pitch of the blades of the first and second propellers.

In addition, the piloting assistance device 20 enables the real mean pitch of the blades of the first and second propellers 6', 6" to be displayed, thus enabling the pilot to compare the real mean pitch with the values that are to be complied with. Thus, the pilot uses the piloting assistance device 20 during:
autorotation flight by aligning the real mean pitch on the second symbol;
forward flight by selecting a current mean pitch that is less than the first symbol;
flight assisted by an autopilot device, by aligning the real mean pitch on the setpoint coming from said autopilot device; and
hovering flight by selecting a real mean pitch that lies within the predetermined optimized range.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, FIG. 1 shows a rotary wing 100 comprising a main rotor 10. Naturally, it is possible for the rotary wing 100 to comprise two main rotors (10) turning at the same speed of rotation, for example, and optionally contrarotating.

What is claimed is:

1. A piloting assistance device for a hybrid helicopter having a rotary wing (100) including at least one main rotor, first and second half-wings (8', 8") provided respectively with first and second propellers (6', 6"), and an engine installation (5') having at least one turbine engine (5) continuously driving said rotary wing (100) and said propellers (6', 6") by meshing with a mechanical interconnection system, said piloting assistance device (20) comprising:
a mean pitch sensor (37) configured to measure a current mean pitch (βcur) of blades of the first and second propellers (6', 6") in real time;
an air speed sensor (31) configured to measure true air speed (VH) of the hybrid helicopter;
a speed of rotation sensor (32) configured to measure speed of rotation (Ω) of the propellers (6', 6") of the hybrid helicopter;
a density sensor (35) configured to measure density of air in the vicinity of the hybrid helicopter;
computer means (40) provided with a memory (42) containing a first equation determining a power gradient (GRD) as a function of the current mean pitch (βcur), the computer means (40) being connected to the mean pitch sensor (37), to the air speed sensor (31), to the speed of rotation sensor (32), and to the air density sensor (35), and being configured to receive first and second power values from a regulator member (34) of said engine installation (5'), said first and second power values relating respectively to a maximum power (P1) capable of being delivered by said engine installation (5') and to a power currently being delivered (P2) by said engine installation (5'), said computer means (40) further configured to determine a maximum mean pitch (βmax) to be complied with for the blades of said first and second propellers (6', 6") without exceeding power available for said propellers (6', 6"), said computer means (40) determining the maximum mean pitch (βmax) as a function of said current mean pitch (βcur), said first and second power values, and said power gradient;
display means (50) configured to present said maximum mean pitch (βmax) on a display screen (60); and
an autopilot device (70) configured to operate in an autopilot mode for controlling flight of the hybrid helicopter, wherein while operating in the autopilot mode the autopilot device controls the driving of said rotary wing (100) and said propellers (6', 6") by said least one turbine engine (5) such that the current mean pitch (βcur) does not exceed the maximum mean pitch (βmax);
wherein said computer means is further configured to determine the maximum mean pitch (βmax) using the equation:

$$\beta max = \beta_{cur} + [(P1*(\Omega/\Omega'))-P2]/GRD$$

where:
"/" represents the division sign;
"*" represents the multiplication sign;
"βmax" represents the maximum mean pitch;
"βcur" represents the current mean pitch as measured in real time;
"P1" represents the maximum power that can be delivered by the engine installation;
"P2" represents the current power being delivered by the engine installation;
"Ω" represents speed of rotation of said propellers;
"Ω'" represents a setpoint for the speed of rotation of said propellers; and
"GRD" represents the power gradient.

2. The piloting assistance device according to claim 1, wherein said computer means (40) control said display means (50) to present a first symbol (55) on the display screen (60), the first symbol representing said maximum mean pitch (βmax).

3. The piloting assistance device according to claim 2, wherein said first power value is indicative of both a first maximum continuous power (PMC) capable of being delivered by said engine installation at a first mode of operation and a second maximum power (PMD) capable of being delivered by said engine installation at a second mode of operation, said computer means (40) determining a first maximum mean pitch for the first mode of operation and a second maximum mean pitch for the second mode of operation, and said computer means (40) controls said display means (50) to present on the display screen (60) a first primary symbol (55') representing said first maximum mean pitch and a first secondary symbol (55") representing said second maximum mean pitch.

4. The piloting assistance device according to claim 1, wherein the air speed sensor (31) is configured to deliver a first speed value relating to the true air speed (VH) of said hybrid helicopter (1) to said computer means (40), and the speed of rotation sensor (32) is configured to deliver a second speed value relating to the speed of rotation (Ω) of said propellers (6', 6") to said computer means (40), said computer means (40) determining an autorotation mean pitch (β0) generating zero thrust for the first and second propellers (6', 6") as a function of the first and second speed values.

5. The piloting assistance device according to claim 4, wherein said computer means (40) control said display means (50) to display on the display screen (60) a second symbol (56) representing said autorotation mean pitch (β0).

6. The piloting assistance device according to claim 4, wherein said computer means (40) control said display means (50) to present on the display screen (60) a second symbol (56) representing said autorotation mean pitch (β0):
if said autorotation mean pitch (β0) is greater than 5 degrees; and
if the measured true air speed (VH) is greater than 20 meters per second.

7. The piloting assistance device according to claim 1, wherein the computer means (40) is further configured to control the display means (50) to present a third symbol (57) on said display screen (60), said third symbol (57) relating to a pitch setpoint given by an autopilot device (70) of said hybrid helicopter (1).

8. A hybrid helicopter (1) comprising:
a hybrid helicopter sub-assembly including a rotary wing (100) provided with at least one main rotor, first and second half-wings (8', 8") provided respectively with first and second propellers (6', 6"), and an engine installation (5') having at least one turbine engine (5) continuously driving said rotary wing (100) and said propellers (6', 6") by meshing with a mechanical interconnection system between the at least one turbine engine, the at least one main rotor, and the propellers to deliver a power, the engine installation further having a regulator member (34) configured to output a first power value relating to a maximum power (P1) capable of being delivered by said engine installation and a second power value relating to a power (P2) currently being delivered by said engine installation;

a piloting assistance device having a mean pitch sensor (37) configured to measure a current mean pitch (βcur) of blades of the propellers (6', 6");

the piloting assistance device further having computer means provided with a memory containing a first equation determining a power gradient (GRD) as a function of the current mean pitch (βcur), the computer means being connected to the mean pitch sensor and being configured to receive first and second power values from a regulator member (34) of said engine installation (5'), said computer means further configured to determine a maximum mean pitch (βmax) to be complied with for the blades of said propellers (6', 6") without exceeding power available for said propellers (6', 6"), said computer means (40) determining the maximum mean pitch (βmax) as a function of said current mean pitch (βcur), said first and second power values, and said power gradient;

the piloting assistance device further having a display screen configured to present said maximum mean pitch (βmax);

wherein said computer means is further configured to determine the maximum mean pitch (βmax) using the equation:

$$\beta max = \beta_{cur} + [(P1*(\Omega/\Omega'))-P2]/GRD$$

where:
"/" represents the division sign;
"*" represents the multiplication sign;
"βmax" represents the maximum mean pitch;
"βcur" represents the current mean pitch as measured in real time;
"P1" represents the maximum power that can be delivered by the engine installation;
"P2" represents the current power being delivered by the engine installation;
"Ω" represents speed of rotation of said propellers;
"Ω'" represents a setpoint for the speed of rotation of said propellers; and
"GRD" represents the power gradient.

9. A method of assisting the piloting of a hybrid helicopter (1) that is provided with a rotary wing (100) provided with at least one main rotor, first and second half-wings (8', 8") provided respectively with first and second propellers (6', 6"), and an engine installation (5') having at least one turbine engine (5), the method comprising:

continuously driving the rotary wing (100) and the propellers (6', 6") with the at least one turbine engine (5) of the engine installation (5') to deliver a power;

measuring a current mean pitch (βcur) of blades of the propellers (6', 6");

determining, by a computer, a power gradient (GRD) as a function of the current mean pitch (βcur);

determining, by the computer, a maximum mean pitch (βmax) to be complied with for the blades of said first and second propellers (6', 6") without exceeding power available for said propellers (6', 6"), wherein the maximum mean pitch (βmax) is determined by the computer as a function of the current mean pitch (βcur), a maximum power (P1) that can be delivered by said engine installation, a current power (P2) being delivered by said engine installation, and the power gradient (GRD); and presenting said maximum mean pitch (βmax) on a display screen;

wherein determining the maximum mean pitch (βmax) includes using the equation:

$$\beta max = \beta_{cur} + [(P1*(\Omega/\Omega'))-P2]/GRD$$

where:
"/" represents the division sign;
"*" represents the multiplication sign;
"βmax" represents the maximum mean pitch;
"βcur" represents the current mean pitch as measured in real time;
"P1" represents the maximum power that can be delivered by the engine installation;
"P2" represents the current power being delivered by the engine installation;
"Ω" represents speed of rotation of said propellers;
"Ω'" represents a setpoint for the speed of rotation of said propellers; and
"GRD" represents the power gradient.

10. The method according to claim 9, wherein determining the power gradient (GRD) as a function of the current mean pitch (βcur) includes using the equation:

$$GRD = 0.5 \times \rho \times \pi \times R^2 \times U^3 \times \frac{\partial CP}{\partial \beta}(0.75\beta_{cur}, \lambda)$$

where:
ρ is the density of air in the vicinity of the hybrid helicopter, U is the speed of a free end of a blade of the propellers, R is the span of the blade of the propellers, CP is a power coefficient, $$\frac{\partial CP}{\partial \beta}$$

represents the partial derivative of the power coefficient relative to the current mean pitch, βcur represents the current mean pitch, and λ represents an advance coefficient as a function of the quotient of true air speed (VH) of the hybrid helicopter divided by the speed (U) of the free end of the blade of the propellers.

11. The method according to claim 9, wherein there is determined and displayed on said display screen (60) an autorotation mean pitch (β0) as a function of the true air speed (VH) of said hybrid helicopter (1) and of the speed of rotation (Ω) of said propellers (6', 6") using the following second relationship:

$$\beta 0 = \alpha 0 + \arctan[VH/(\Omega*0.75*R)]$$

where:
"/" represents the division sign;
"*" represents the multiplication sign;
"arctan" represents the arc tangent trigonometric function;
"β0" represents the autorotation mean pitch;
"α0" represents the angle of incidence of a blade of a propeller that would generate zero lift by said blade;
"VH" represents the true air speed of the hybrid helicopter;
"Ω" represents the speed of rotation of said propellers; and
"R" represents the span of said blade.

* * * * *